Aug. 8, 1950 N. BARANOV 2,518,271

DEVICE FOR REDUCTION OF CROSSTALK BETWEEN TWO COAXIAL PAIRS OF A TELEPHONE CABLE

Filed Dec. 29, 1945 2 Sheets-Sheet 1

Inventor.
Nathalie Baranov
By Williams, Bradbury & Hinkle
Attorneys

Aug. 8, 1950

N. BARANOV 2,518,271

DEVICE FOR REDUCTION OF CROSSTALK BETWEEN TWO COAXIAL PAIRS OF A TELEPHONE CABLE

Filed Dec. 29, 1945

2 Sheets-Sheet 2

Inventor
Nathalie Baranov
By Williams, Bradbury & Hinkle
Attorneys

Patented Aug. 8, 1950 2,518,271

UNITED STATES PATENT OFFICE 2,518,271

DEVICE FOR REDUCTION OF CROSS TALK BETWEEN TWO COAXIAL PAIRS OF A TELEPHONE CABLE

Nathalie Baranov, Paris, France, assignor to Societe Anonyme de Telecommunications, Paris, France, a French body corporate Application December 29, 1945, Serial No. 637,929
In France February 7, 1945

6 Claims. (Cl. 179—78)

The present invention relates to multi-conductor telephone cables comprising a plurality of coaxial pairs and more particularly to arrangements for reducing crosstalk between signalling systems.

It has been found heretofore that in a cable comprising a plurality of coaxial pairs there exists a distributed coupling between the pairs that gives rise to crosstalk. This coupling, called mutual impedance coupling, bears for a given frequency a constant value at any point on the line. It follows that the far-end crosstalk is proportional to logarithm of the number of the sections connected together into a line.

A and B represent two coaxial parallel pairs (Fig. 1) subdivided into sections 1, 2, 3, 4. A voltage U is applied to the pair A, at the far end a voltage U′ is received on pair A at or near the end, and a voltage $u'$ due to crosstalk couplings is received on the pair B. By definition the far end crosstalk $E_2$ over the whole length of the four sections is given by:

$$E_2=\log\frac{U'}{u'}$$

In order to improve the transmission condition the value of the crosstalk $E_2$ must be inncreased by the reduction of crosstalk voltage $u'$.

The voltage $u'$ is the algebraic sum of the disturbance voltages $u'_1$, $u'_2$, $u'_3$, $u'_4$, originating in sections 1, 2, 3 and 4. The crosstalk coupling being of constant value, the voltages $u'_1$, $u'_2$, . . . are all equal and of the same phase, they sum up arithmetically, as indicated on the vector diagram in Fig. 2*a*.

In a most general case, let L be the length of the line (for instance 1000 km.) consisting of N equal sections the length of which is $h$ (for instance 16 km. this being the usual length of a coaxial pair section). Let further C be the propagation constant of one section; for the whole cable that constant will be NC. The far end crosstalk $E_2$ of the whole cable will be hereafter calculated in terms of the far end crosstalk $E_1$, corresponding to one section.

Let $$U_1,\ U_2,\ U_3\ .\ .\ .\ U_n\ .\ .\ .\ U'$$

be the voltages at the end of the successive sections of pair A, $$U'=Ue^{-NG}$$

and let $$u_1,\ u_2,\ u_3\ .\ .\ .\ u_n\ .\ .\ .\ u_N$$

the disturbance voltages resulting in the successive sections of pair B from the coupling with the corresponding section of pair A respectively.

At the end of the cable these disturbance voltages will have this value:

$$u'_1,\ u'_2,\ u'_3\ .\ .\ .\ u'_n\ .\ .\ .\ u'_N$$

As above mentioned the coupling having a constant value at any point of the line, the voltage ratio $$\frac{U_n}{u_n}$$

for one section is a constant $k$.

The voltages $U_n$ and $n_n$ at the end of section $n$ will be:

$$U_n=U_e^{-nG} \qquad \text{and} \qquad u_n=\frac{1}{k}Ue^{-nG}$$

At the end of the cable $u_n$ gives rise to the voltage $$u'_n=u_ne-(N-n)G=\frac{1}{k}Ue^{-NG}$$

The crosstalk voltage $u'$ at the end of the cable being the arithmetical sum of the voltages $u'_n$ originating from the successive sections, the voltage ratio at the end of the cable is:

$$\frac{U'}{u'}=\frac{kUe^{-NG}}{NUe^{-NG}}=\frac{k}{N}$$

It follows that $$E_2=\log\frac{U'}{u'}=\text{Log}\,\frac{k}{n}=\log\frac{U_n}{u_n}-\text{Log}\,N$$

$$E_2=E_1-\log N \qquad (1)$$

This formula means that the crosstalk voltage of an N section cable is N times greater than the crosstalk voltage of one single section, and that the cross-talk of N sections is log N times less than the crosstalk of one section. If L=1000 km. and $h$=16 km.

$$E_2=E_1-4.1 \text{ nepers}$$

In order to increase the value $E_2$, special measures have to be taken, either by increasing $E_1$ to a sufficiently high value (such as the arrangement of important shields on the coaxial conductors) to make the diminution of 4.1 nepers admissible, or by finding a disposition, effected during the laying down and connecting of the individual sections, permitting a more favourable crosstalk composition law.

Following these ideas, it has been proposed to phase shift by $\pi$ on some of the joints (e. g. on every other) the current in one of the pair, e. g. in B. This can be carried out by means of either a phase shift transformer, or a triode tube introduced on B. This phase shift opposes the crosstalk voltage originating in one section against the crosstalk voltage originating in the following section.

These methods present numerous drawbacks, the principal ones being:

The application of the first method necessitates the interruption of the circuit at multiple points.

The second method is applicable when repeaters are provided and necessitates a study of different repeaters for the two coaxial pairs. According to this method, the repeaters provided for one of the pairs ought to contain systematically one tube more than the repeaters provided for the second pair, all their remaining characteristics being identical, conditions very difficult to fulfill.

The object of the present invention is to provide a multicircuit coaxial conductor cable in which the coaxial pairs comprise means for rendering their phase angles different from one another in a manner to phase-shift between them the cross-talk voltages induced by one pair in the other pairs so as to reduce the value of the resultant far-end cross-talk voltage.

Another object of the present invention is to provide a multicircuit coaxial conductor cable wherein the value of the capacity C and of the self-inductance L of the coaxial pairs are proportioned in a manner that the expression LC corresponding to different pairs are different from one another, whereby the phase constants of the said pairs have different values in order to reduce the far-end crosstalk voltages.

A further object of the invention is to provide a multicircuit coaxial conductor wherein each of the coaxial pairs has the same structure as any other and comprising phase-shift networks built into the pairs at the junction points between the sections and having characteristics such that the pairs present different values of the expression LC whereby the phase constants of the said pairs have different values in order to reduce the far-end crosstalk voltage.

Another object of the invention is to provide a multicircuit coaxial conductor cable wherein each of the coaxial pairs has the same structure as any other and comprising phase-shift networks of the T bridge network type built at the junction points between the section.

Still another object of the invention is to provide a multicircuit coaxial conductor cable wherein the coaxial pairs have different structures in a manner that the expression LC corresponding to the different pairs have values different from one another, whereby the phase constants of the said pairs have different values in order to reduce the far-end crosstalk voltage.

As an example, several embodiments of the present invention are described below, and are illustrated in the accompanying drawings:

Figs. 1 and 2 described above explain the theory underlying the origin of the far end crosstalk and the principle of the present invention.

The necessary phase shift between the coaxial pairs can be obtained in a discontinuous way by an artificial introduction of a phase shift $a$ in the circuit of one of the pairs at some of the joints. The result is shown on the voltage diagram in the Fig. 2$b$. In this case the expression giving the crosstalk is the following:

$$E_2=\log\frac{U'}{u'}=E_1-\log\frac{\sin\frac{aN}{2}}{\sin\frac{a}{2}} \qquad (2)$$

where N denotes the number of sections to be connected together, and $a$ the phase shift introduced at a joint and at the same time the angle shift of the disturbance tensions with relation to one another at the far-end of the line.

In order to reduce $u'$ to zero, it is sufficient to make $$\frac{aN}{2}=\pi$$

$a$ must be chosen in such a manner as e. g. to result in a voltage diagram according to Fig. 2$c$ or 2$d$, which refer to the cases 4 or 8 sections respectively.

It is clear that to obtain the resultant voltage zero, it is necessary to introduce at each joint on one of the pairs, e. g. on the conductor B, a phase shift at least equal to: $2\pi/N-1$.

An appreciable improvement is gained, even if the overall angle differs from $2\pi$, provided that $\sin a/2$ reaches a suitable value. Evidently the disturbance voltage will be reduced, even if different phase shifts are introduced on different joint-points, on the condition that the phase shift signs are the same and the sum of the phase shift angles equals $2\pi$.

In the case of an N sections line, it is possible, either to introduce, as indicated above, a phase shift equal to $2\pi$/N−1 at N−1 joints, or a phase shift greater at a smaller number of joints.

It is particularly advantageous to employ adjustable phase shift devices permitting an introduction of phase shift angle at desire, according to each particular case. On the other hand these devices give a possibility of best far end crosstalk adjustability over the totality of sections, thanks to the phase shift variations at one or at several line joints. It is possible also to provide permanent phase shift devices for some of the joints, and adjustable phase shift devices on the remaining ones, the latter allowing to equalize the difference.

In order to obtain the necessary phase shifts, use can be made of permanent or adjustable phase shifts networks for joints having no amplifiers, and of permanent or adjustable phase shift amplifiers for joints provided with amplifiers. The well known systems, called "lattice-type network" or the one called "T-bridged network" may be employed as phase shift means.

From the three phase shifts systems shown in the Figs. (3$a$, 3$b$ and 3$c$), 3$a$ and 3$c$ are fundamental lattice type networks and 3$b$ a network equivalent to 3$a$.

Figure 1:
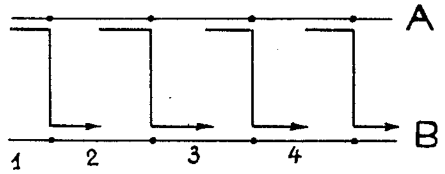
Figure 2A:
Figure 2B:
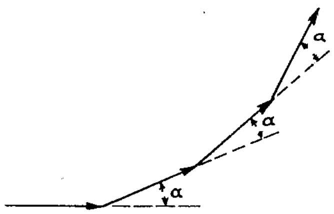
Figure 2C:
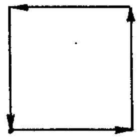
Figure 2D:
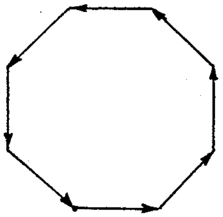
Figure 3A:
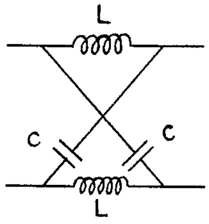
Figs. 3 and 4 illustrate diagrammatically phase shift networks.
Figure 3B:
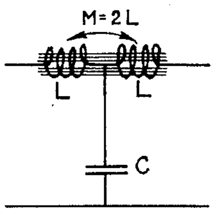
Figure 3C:
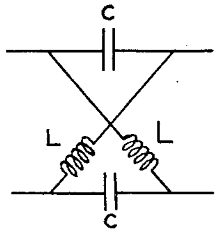
Figure 4A:
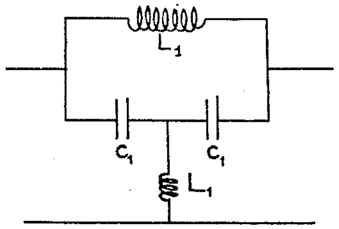
Figure 4B:
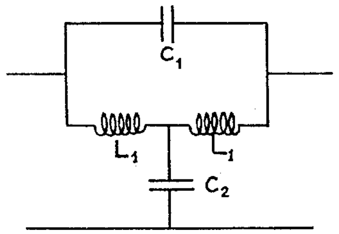

The networks shown in Figs. 4$a$ and 4$b$ are T bridged networks.

Networks derived from the above fundamental systems can be proposed by replacing simple inductance and capacity elements by complex elements consisting of inductance and capacities branched in parallel or in series.

To vary the network angle, it suffices to replace the permanent L and C elements by adjustable ones.

Given $a_1$ as network angle foreseen for the coaxial pair A, and $a_2$ the network angle foreseen for the coaxial pair B. The systems will be established in a manner to make $a_1-a_2$ equal the phase shift looked for. It is worth to notice that it is possible to provide for the pairs A and B either networks according to Fig. 4*a*, or networks according to Fig. 4*b*, or one of each kind of networks.

It is a known fact that from the far end crosstalk point of view, the lower transmission band limit frequency is the most dangerous one, and therefore it will be in regard to this frequency that the phase shift network will have to be designed.

With the introduction of a phase shift element on the pair B, a certain attenuation is necessarily introduced. A system having the same attenuation has to be employed therefore on the pair A. If this system presents at the same time a phase, the effective phase shift $a_1-a_2$ will be equal to the two coaxial pairs A and B system phase difference. A system giving rise to an angle $+a$ can be branched on to the one pair and a system giving rise to an angle $-a$, on to the other. Similarly, the electric properties of the pair A amplifier have to be identical in all details to those of the pair B amplifier, apart from the phase shift concerning characteristics; the effective phase shift introduced by the combination of the two repeaters will equal the difference of their respective phases.

In the above, a proposition was made of introduction of phase shifts of considerable importance at junction points between the individual sections of the cable, this means at considerable distances, which may vary between 10 and 15 km.

It will be understood that within the scope of this invention, phase shifts of lesser degree can be introduced at less distant points, e. g. at splice points between the manufacturing lengths of cable.

In this case, it is sufficient e. g. to foresee two different splice specimens. The first type introducing a practically zero angle will be employed on the first coaxial pair and the second type introducing a predetermined angle will be practiced on the second coaxial pair.

The desired phase shift can be obtained also by provision of different phase constants for the two coaxial pairs, thus permitting at the far end of the disturbed pair to vary in a continuous manner the voltage phase shift of the far end crosstalk, induced along this pair.

Given $E_1$ as far end crosstalk over a section $h$ and $E_2$ as far end crosstalk of a line consisting of N sections. $a_1$ is the phase constant per kilometer in pair A and $a_2$ the one in pair B.

In the case of two identical coaxial pairs, the Formula 1 is applicable and denoting the attenuation in the coaxial pairs by $b$ it follows:

$$a_1=a_2 \qquad b_1=b_2 \qquad E_2=E_1-\log N \qquad (3)$$

In the case where the two coaxial pairs have their phases different and the attenuation identical, one has then:

$$|a_1-a_2|=\Delta a b_1=b_2 E_2=E_1-\log \frac{2 \sin \frac{Nh\Delta a}{2}}{h\Delta a} \qquad (4)$$

If $\Delta a$ is small, the Formula 4 is reduced to the Formula 3. It follows from the Formula 4 that particularly advantageous conditions are obtained when $Nh\Delta a=2\pi$, $4\pi$, et cetera. The most unfavorable crosstalk value $E_{20}$ will be $$E_{20}=E_1-\log \frac{2}{h\Delta a} \qquad (5)$$

It is sufficient to make $h\Delta a=2$ radians to have the overall line crosstalk never worse than that of a single section.

Given as an example the case of N sections, $h=16$ km. in length, to be joined together. For a 16 km. coaxial pairs section the phase at 60 kilocycles is equal to 22.6 radians. To arrive at the conditions represented by the Formula 5, the phase of the second pair has to be equal to:

$$22.6+2=24.6 \text{ rads.}$$

It suffices in this case to make the phase constant of the second pair exceed by 10% the one of the first pair.

With phase angle difference of 3%, easier to arrive at, the Formula 5 gives:

$$E_2=E_1-\log \frac{2}{0.67}=E_1-1$$

a value acceptable in all respects.

It is reminded that this is the most unfavourable value attainable by $E_2$, ever for very high values of N.

At present, to compare it with the crosstalk just found, the crosstalk obtainable between two identical coaxial pairs will be calculated. By applying the Formula 1:

$$E_2=E_1-\log N$$

Comparing the two expressions for $E_2$, it will be found that the proposed device presents advantages more appreciable the higher the value of N.

As the phase constant is proportional to square root of the self-inductance capacity product, there exists a number of different means for obtaining coaxial conductors with different phase constants.

The relationship is represented by:

$$a=w\sqrt{LC}$$

where L is the inductance, $w=2\pi\times$frequency and C the capacity.

Capacity modifications can be performed e. g. by introduction of a higher mean dielectric constant in one pair than in the other one. This result can be attained either by use of dielectrics having different constants, or for the same dielectric by varying the dielectric-air relationship per unit length (e. g. in the continuous insulation cases by changes in insulation tape step, in the discontinuous insulation cases by insulation discs gap modifications). To maintain the same attenuation it suffices to increase, in suitable proportions the diameters of the higher dielectric constant coaxial pair.

Similarly, modifications of the inductance L give variations in $a$.

The inductance L of a coaxial pair is known to be built up by three inductance components to be investigated: the internal inductance $L_1$ of the inner conductor, the external inductance $L_{12}$ of the insulating medium, the internal inductance $L_2$ of the outer conductor.

The inductance $L_1$ of the inner conductor is known to have an appreciable magnitude at low frequencies and approaches zero when the frequency increases. In the case of a solid cylinder the self-inductance under continuous current conditions is equal to $50\mu$ microhenrys independently of the cylinder diameter ($\mu$ being the cylinder permeability) and, in the case of a tube, where $r$ is its radius and $t$ its thickness, this self-induction is equal to $66.6\mu\ t/r$ microhenrys.

On the other hand, under high frequency conditions, this self-inductance depends only on the diameter and on the nature of the outer surface of the conductor. Eventually this inductance is reduced to zero at very high frequency independently of the conductor structure (cylinder, tube, etc.).

The resistance (and following it the attenuation) is known to depend at high frequency only on the nature and diameter of the outer surface of the conductor.

It will be realised now that it is possible to manufacture coaxial pairs having identical characteristics at high frequency and different inner conductor structures, thus presenting different inductances at low—and medium frequencies. (The so-called medium frequency comprises a frequency band whose crosstalk has to be improved and which is situated between 60 and 100 kilocycles for normal construction coaxial pairs.)

Figure 5:
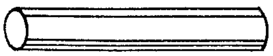
Figs. 5 to 13 show diverse manufacture types of central conductors used to build up coaxial pairs according to the invention.

For this reason, the inner conductors are provided with structures as follows from the figures included:

Fig. 5 shows a solid cylinder.

Figure 6:
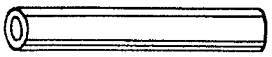

Fig. 6 shows a hollow cylinder.

Figure 7:
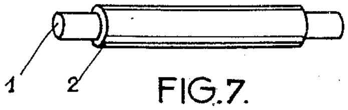

Fig. 7 shows a tube 2 with an iron or insulating material core 1 as support.

The internal inductance of the different structure inner conductors as well as the total inductance corresponding to the radius proportion of two conductors equal to 4, were calculated for different frequencies. In these conditions $L=277+L_1$ microhenrys ($L_2$ is neglected, this inductance being small in comparison with the two others). The results obtained for two simple structures are shown on the table below:

*Table I*

| Conductor structure | $f$ kilocycles/sec. | $L_1$ μh/km. | $L$ μh/km. |
|---|---|---|---|
| Solid cylinder | 0 | 50 | 327 |
| Radius $r=1$ mm | 20 | 42 | 319 |
| | 60 | 26 | 303 |
| | 100 | 20 | 297 |
| Hollow tube $r=1.1$ mm | 0 | 6.1 | 283 |
| Thickness $t=0.1$ mm | 20 | 6.1 | 283 |
| | 60 | 6.1 | 283 |
| | 100 | 6.1 | 283 |

A tube filled with an insulating material gives substantially the same niductance.

The inductance difference at 60 kilocycles/sec. is 7%, which gives 3.5% difference between $a_1$ and $a_2$, a value acceptable under all respects.

The method described above permits to vary $a$ at medium frequency, at the same time conserving all the high frequency characteristics unchanged.

Figure 8:
Figure 9:
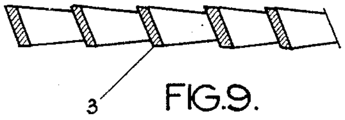
Figure 10:
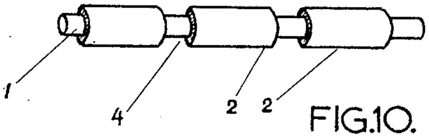
Figure 11:
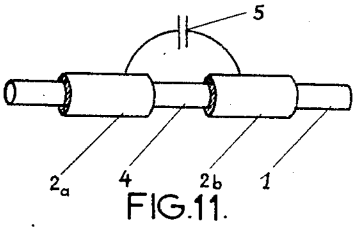

If high frequency characteristics, differing only slightly from those of solid cylinder, are accepted for the different conductors, a number of other devices can be provided to vary $a$ at medium frequency. Thus an inner conductor of helix form, as shown in Fig. 8, permits to obtain very great phases. According to the step and the width of the helix different inductances are obtained at medium and low frequencies. An inductance different from the one of a cylinder at low frequency and characteristics neighbouring the ones of a solid cylinder at high frequency will be obtained, if the helix is constructed in a manner to establish an electric contact between the spires at high frequency and to render the spires insulated at medium frequency. This combination can e. g. be carried out as shown on the Fig. 9 by winding a ribbon with overlapping edges which are insulated by an insulating tape 3 or by varnish. At very high frequencies this insulation will be inactive, as the capacity will be sufficient to assure an electric contact, at the same time, however, the insulation will be effective at medium frequency. An iron core or any other metal core can be used as the copper helix supporting device. In Fig. 10 a conductor is shown formed by an iron core 1 surrounded by a tube 2 cut up into sections by slits 4, which are sufficiently narrow not to form any obstacles for high frequency currents. This arrangement permits to obtain an appreciable increase of inductance at medium frequency and characteristics neighbouring those of solid cylinder at very high frequencies. The slits can be spaced and their width increased as foreseen in Fig. 11. In this case, it is necessary to provide a condenser 5 tapped across the slit. This arrangement can be applied at the coaxial pairs splice points.

Figure 12:
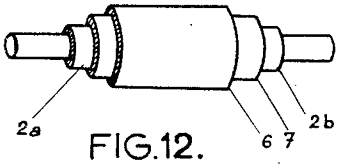

The condenser will be advantageously formed (Fig. 12) by a copper tube 6 lined internally with an insulating tube 7, applied over the two sections 2$a$ and 2$b$. This arrangement presents the advantage of conserving the circular symmetry of the coaxial pairs.

The object looked for is to make the high frequency current pass through the tube 6 and medium frequency current through the iron cylinder. The length of tube 6 and the insulating material thickness will be chosen in a manner to attain the required capacity value for this effect. This value will depend essentially on the medium frequency and high frequency band limits. (In case of this arrangement, a cut-off frequency between the two frequency bands will result, which may be found inconvenient for some of the coaxial pairs applications).

Figure 13:
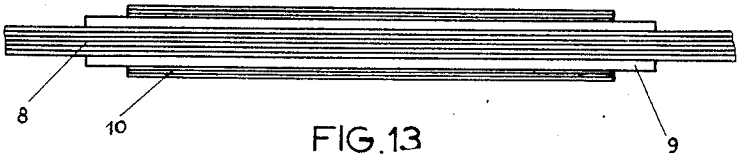

Fig. 13 shows an inner conductor consisting of a metal core 8 (copper, aluminium, iron, etc.), a tube or an insulating lining 9, and a metal tube 10 (copper, aluminium, etc.).

It is possible also to obtain different phase angles by associating two different dimension coaxial pairs, an arrangement applicable especially in the case of four coaxial pairs cable.

For the sake of better understanding, the medium and high frequency limits were indicated in the above description corresponding to the application of coaxial pairs for telephone service. It is evident that these limits can change in view of other applications of coaxial conductors. In a general manner, the medium frequency band is called here the one, whose crosstalks ought to be improved and the high frequency band the one whose improvement is not required.

In case of changes in external inductance $L_{12}$, use can be made of loaded coaxial pairs, it means these whose permeability was artificially increased by the introduction of a magnetic material.

By association of one loaded pair with another, unloaded, or with one differently loaded, the desired phase shift will be obtained.

Until now there was only the question of the cross-talk between coaxial pairs of a two coaxial pairs cable. When several coaxial pairs are foreseen in the same cable, the arrangements described, aiming at the phase angle $a$ change, are still applicable, but some precautions have to be taken.

In a cable of $n$ coaxial pairs, on arranging them in a manner such as to obtain coaxial pairs angles in an arithmetic progression.

$$a_0,\ a_0+\frac{2\pi}{n},\ a_0+2\frac{2\pi}{n},\ a_0+3\frac{2\pi}{n}$$

there will certainly result in a phase shift between any of the coaxial pairs, and correspondingly in a crosstalk reduction between these systems.

In each particular case, nevertheless, a simple reasoning will permit to reduce greatly the number of different types of coaxial pairs.

Thus, in case of coaxial pairs, separated by another coaxial pair, this last forms a screen, and no inconveniences are experienced when the non-adjacent coaxial pairs are identical. In a cable where the coaxial pairs are placed in the same layer, it is generally sufficient to foresee two types of coaxial pairs presenting different phases and disposed alternatively.

Coaxial pairs can be employed having, one a solid cylinder inner conductor according to Fig. 5, and the other a tube of the same diameter according to Fig. 6; the two pairs can e. g. possess dimensions and characteristics of table I or different other structures, indicated in Figs. 7 to 13 or in the preceding text.

Some precautions have, however, to be taken in the case where the cable consists of a small number of coaxial conductors.

Figure 15:
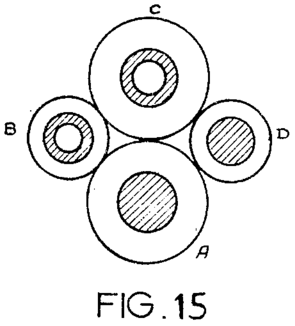

In a four coaxial pairs cable e. g. where the same type pairs are diametrically opposed, it is clear that the intermediate coaxial pairs do not permit a sufficient crosstalk reduction, it is necessary then to give to the four coaxial pairs A, B, C, D different phase constants by adaptation e. g. of the following solutions:

*First solution (Fig. 15)*

Pair A is formed by solid cylinder inner conductor (normal pair). The inner conductors of pair B, pair C, pair D are formed by tubes of the same outer diameter as that of the pair A, but of different inner diameters.

*Second solution*

The two couples of the opposed pairs A and C from one side and B, D from the other side have different diameters (a diameter ratio equal to 3/2 permitting the realisation of a circular cable core will be particularly advantageous). Disposition as in Fig. 15 can be adopted, thus giving:

| | Diameter of the outer conductor | Inner conductor |
|---|---|---|
| Pair A | d | solid cylinder. |
| Pair B | 2/3 d | tube. |
| Pair C | d | Do. |
| Pair D | 2/3 d | solid cylinder. |

Figures 14, 16:
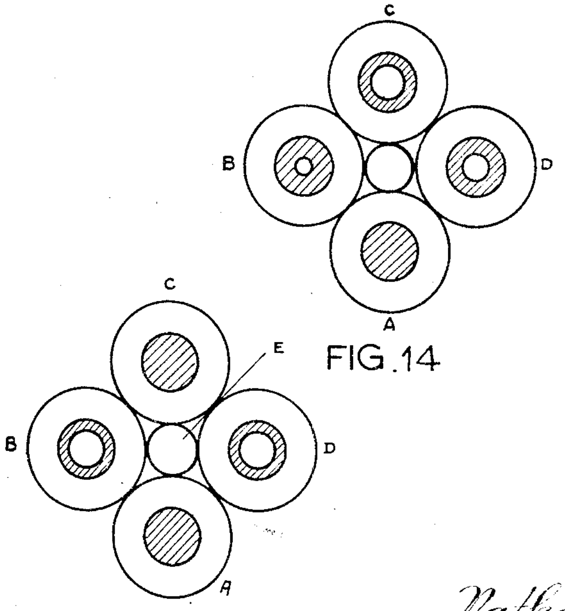
Figs. 14 to 16 represent according to the invention three coaxial pairs dispositions in a four coaxial pairs cable.

In order to reduce the number of pair types, use can be made of a ferromagnetic packing of a crossbar or any other form, lodged in the central space as represented by E in Fig. 16. This packing, whose dimensions and structure is determined for each particular case to obtain the desired protection, can be manufactured in the X form or in the form of a tube, or of a divided iron or copper wire to constitute a cushion, or in any other form conveniently designed.

The arrangement shown in Fig. 16 will then be applied, it follows:

Pair A and pair C: normal pair
Pair B and pair D: pair according to Fig. 6

It is also possible to choose a thicker pair for A and C than for B and D. In this case, the packing E will be formed by a flat screen (ribbon, etc.).

In the case when the number of coaxial pairs exceeds four, the central space is usually occupied by a coaxial pair or a quad packing with a ferromagnetic protection perhaps, thus assuring a sufficient crosstalk reduction between the diametrically opposed coaxial pairs.

Other means, known already, for type number reduction in coaxial pairs, permitting even the use of a single type of coaxial pair, are based on the coexistence in the same cable of coaxial pairs transmitting in opposite directions.

On the ground that the near end crosstalk between coaxial pairs is much more favorable than the far end crosstalk, it was proposed to employ, in the case of two coaxial pair cable or when several coaxial pairs are placed in the same layer in the cable, the adjacent coaxial pairs in the opposite direction transmission, that is to say, one pair in the "go" direction and the other in the "return" direction. The non-adjacent coaxial pairs, separated by other pairs forming a screen, are used for the same direction traffic.

A four coaxial pair cable where two pairs transmit in one direction (direction west-east) and the two others in the other direction (direction east-west) will be manufactured in a manner to impart different phase constants to the pairs transmitting in the same direction and same phase constants for the pairs transmitting in the opposite directions.

An example:

| | |
|---|---|
| Pair A (direction W-E) and pair C (direction E-W) | Normal pair |
| Pair B (direction W-E) and pair D (direction E-W) | Pair with an inner conductor in form of a tube. |

Another solution consists to choose a certain dimension for the pairs A and C and different dimensions for the pairs B and D (e. g. smaller).

The solutions that are exposed above are given only for example's sake. The object looked for, that is that of improvement of the crosstalk between coaxial pairs lodged in the same cable can be attained in a general way by introduction of different construction forms, in the pairs of the same cable, resulting in different phase constants; these pairs can be chosen or not among those described above and combined between themselves in all possible manners.

What I claim is:

1. A cable comprising a plurality of coaxial pairs, each of said pairs comprising an inner conductor, a hollow outer conductor and insulating means provided between the inner and outer conductors, each pair being exposed to cross-talk from the other pairs, and at least a part of the coaxial pairs is provided with different loads formed by magnetic materials having different permeabilities respectively, whereby the phase constants of said pairs have different values in order to reduce the far-end cross-talk voltage.

2. A cable comprising a plurality of coaxial pairs, each of said pairs comprising an inner conductor, a hollow outer conductor and insulating means provided between the inner and outer conductors, each pair being exposed to cross-talk from the other pairs, and said coaxial pairs having different diameters, whereby the phase constants of said pairs have different values in order to reduce the far-end cross-talk voltage.

3. A cable comprising a plurality of coaxial pairs, each of said pairs comprising an inner conductor, a hollow outer conductor and insulating means provided between the inner and outer conductors, each pair being exposed to cross-talk from the other pairs, and the different coaxial pairs have their inner conductors of different structures, respectively, whereby the phase constants of said pairs have different values in order to reduce the far-end cross-talk voltage.

4. A cable comprising a plurality of coaxial pairs, each of said pairs comprising an inner conductor, a hollow outer conductor and insulating means provided between the inner and outer conductors, each pair being exposed to cross-talk from the other pairs, and a part of said coaxial pairs having their inner conductors made of solid copper cylinders and the other part of said pairs having their inner conductors made of tubes of different thickness, whereby the phase constants of said pairs have different values in order to reduce the far-end cross-talk voltage.

5. A cable comprising a plurality of coaxial pairs, each of said pairs comprising an inner conductor, a hollow outer conductor and insulating means provided between the inner and outer conductors, each pair being exposed to cross-talk from the other pairs, each of said pairs being constructed of a plurality of sections joined together, and phase shift networks of the T bridge network type built into the pairs at the junction points between the sections and providing different phase shifts in the respective pairs, whereby the phase constants of said pairs have different values in order to reduce the far-end cross-talk voltage.

6. A cable comprising a plurality of coaxial pairs, each of said pairs comprising an inner conductor, a hollow outer conductor and insulating means provided between the inner and outer conductors, each pair being exposed to cross-talk from the other pairs, and the said insulating means for the different pairs having different dielectric constants, respectively, whereby the phase constants of said pairs have different values in order to reduce the far-end cross-talk voltage.

NATHALIE BARANOV.

REFERENCES CITED

The following references are of record in the file of this patent:

UNITED STATES PATENTS

| Number | Name | Date |
|---|---|---|
| 1,762,755 | Black | June 10, 1930 |
| 1,855,288 | Green | Apr. 26, 1932 |
| 1,871,906 | Nyquist | Aug. 16, 1932 |
| 1,928,735 | Nyquist | Oct. 3, 1933 |
| 2,038,240 | Schelkunoff | Apr. 21, 1936 |
| 2,092,023 | Rost | Sept. 7, 1937 |
| 2,105,168 | Staples | Jan. 11, 1938 |
| 2,243,851 | Booth et al. | June 3, 1941 |